(12) United States Patent
Yoon et al.

(10) Patent No.: US 12,497,390 B2
(45) Date of Patent: Dec. 16, 2025

(54) INTERMEDIATE USEFUL FOR SYNTHESIS OF SGLT INHIBITOR AND METHOD FOR PREPARING SGLT INHIBITOR USING SAME

(71) Applicant: Daewoong Pharmaceutical Co., Ltd., Hwaseong-si (KR)

(72) Inventors: Youn Jung Yoon, Yongin-si (KR); Hee Kyoon Yoon, Cheongju-si (KR)

(73) Assignee: DAEWOONG PHARMACEUTICAL CO., LTD., Hwaseong-si (KR)

( * ) Notice: Subject to any disclaimer, the term of this patent is extended or adjusted under 35 U.S.C. 154(b) by 650 days.

(21) Appl. No.: 17/799,054

(22) PCT Filed: Feb. 26, 2021

(86) PCT No.: PCT/KR2021/002507
§ 371 (c)(1),
(2) Date: Aug. 11, 2022

(87) PCT Pub. No.: WO2021/172955
PCT Pub. Date: Sep. 2, 2021

(65) Prior Publication Data
US 2023/0096670 A1   Mar. 30, 2023

(30) Foreign Application Priority Data
Feb. 27, 2020   (KR) .................. 10-2020-0024525

(51) Int. Cl.
*C07D 407/04* (2006.01)
*C07D 307/79* (2006.01)
(52) U.S. Cl.
CPC ......... *C07D 407/04* (2013.01); *C07D 307/79* (2013.01); *C07B 2200/13* (2013.01)
(58) Field of Classification Search
CPC .................................................. C07D 407/04
See application file for complete search history.

(56) References Cited

U.S. PATENT DOCUMENTS

| 10,640,496 | B2 | 5/2020 | Yoon et al. |
| 10,889,574 | B2 | 1/2021 | Yoon et al. |
| 2014/0274918 | A1 | 9/2014 | Choi et al. |

FOREIGN PATENT DOCUMENTS

| CN | 108530408 A | 9/2018 |
| EP | 3473621 A1 | 4/2019 |
| KR | 20140022086 A | 2/2014 |
| KR | 20140114304 A | 9/2014 |
| KR | 20170142904 A | 12/2017 |
| WO | 2012165914 A2 | 12/2012 |
| WO | 2016098016 A1 | 6/2016 |
| WO | 2017217792 A1 | 12/2017 |

OTHER PUBLICATIONS

Extended European Search Report issued Mar. 4, 2024 in EP Application No. 21761658.0.
Office Action issued May 24, 2023 in IN Application No. 202237044989.
Int'l Search Report issued Jun. 15, 2021 in Int'l Application No. PCT/KR2021/002507.
Metil et al., "Synthesis and Optimization of Canagliflozin by Employing Quality by Design (QbD) Principles," Organic Process Research & Development, vol. 22, pp. 27-39 (2018).

*Primary Examiner* — Golam M Shameem
(74) *Attorney, Agent, or Firm* — Panitch Schwarze Belisario & Nadel LLP

(57) ABSTRACT

An intermediate useful for the synthesis of an SGLT inhibitor and a method for preparing an SGLT inhibitor are provided. By employing an intermediate having Chemical Formula 5, the difficulty of purification with existing processes can be solved, the quality requirements for related substances can be achieved with only one purification step, and the quality control problem in each step can be solved by performing several steps in situ. A method for synthesizing a compound of Chemical Formula 1 by using a compound of Chemical Formula 5 enables purification in an earlier step, thereby solving the problems of existing synthesis processes, in which the quality requirements for related substances were difficult to control step-by-step due to a continuous process, thereby minimizing the amount of related substances in the final product. In addition, the yield of a diphenylmethane derivative according to Chemical Formula 1 is increased.

4 Claims, 3 Drawing Sheets

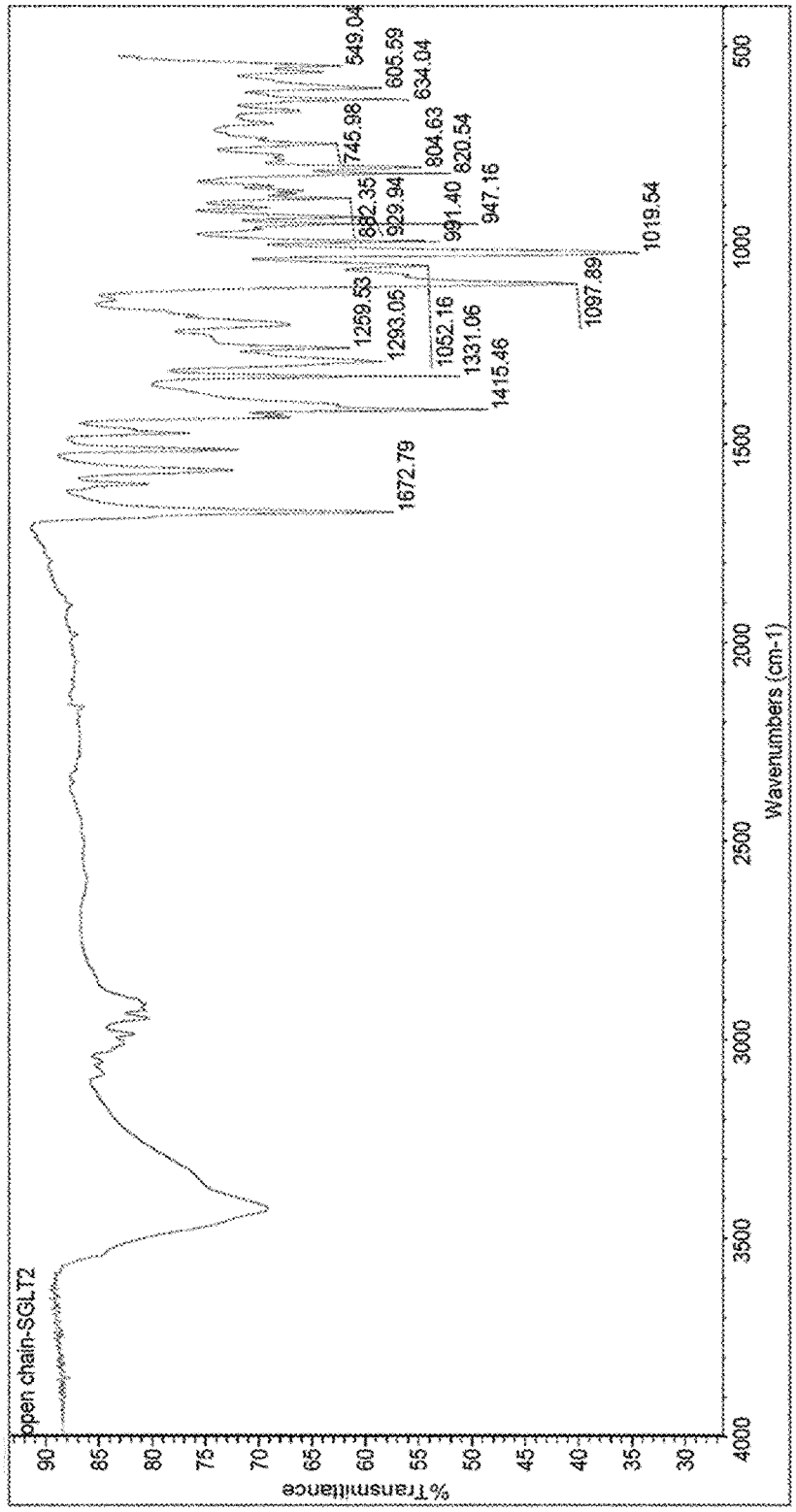
[Figure 1]

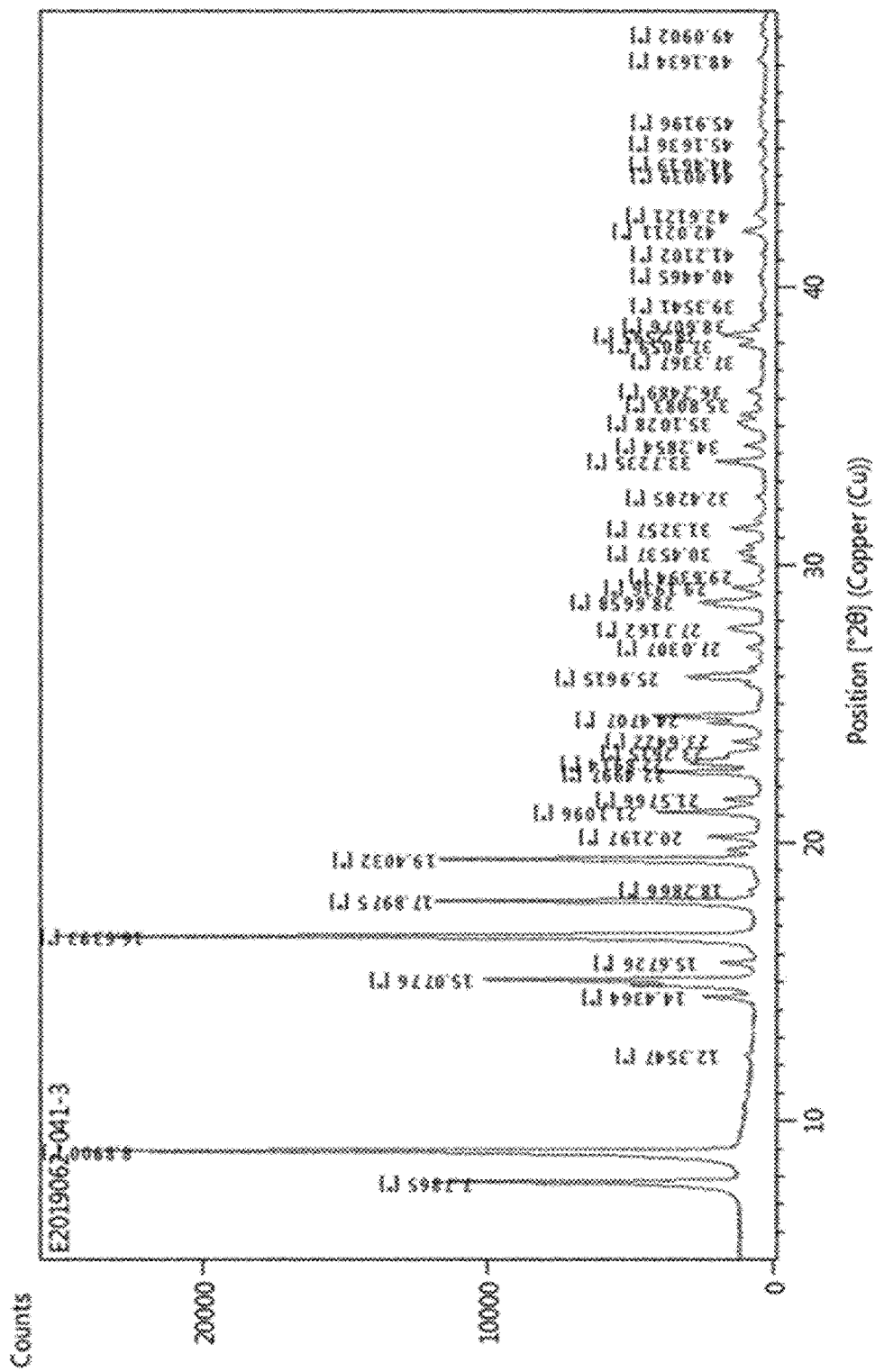
[Figure 2]

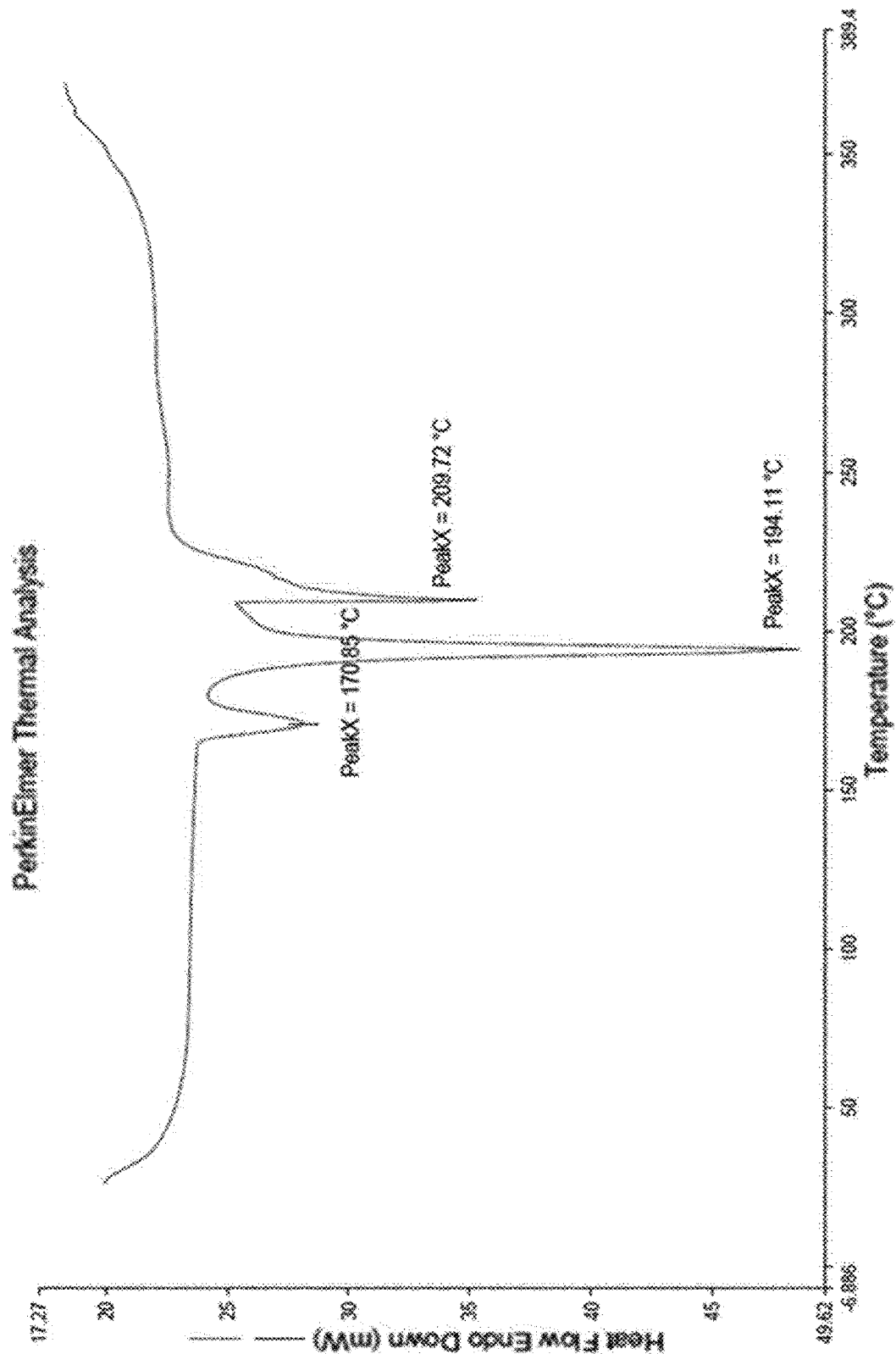
[Figure 3]

INTERMEDIATE USEFUL FOR SYNTHESIS OF SGLT INHIBITOR AND METHOD FOR PREPARING SGLT INHIBITOR USING SAME

CROSS-REFERENCE TO RELATED APPLICATIONS

This application is a Section 371 of International Application No. PCT/KR2021/002507, filed Feb. 26, 2021, which was published in the Korean language on Sep. 2, 2021 under International Publication No. WO 2021/172955 A1, which claims priority under 35 U.S.C. § 119 (b) to Korean Application No. 10-2020-0024525, filed Feb. 27, 2020, the disclosures of which are incorporated herein by reference in their entireties.

TECHNICAL FIELD

The present invention relates to an intermediate useful for the synthesis of an SGLT inhibitor and a method for preparing an SGLT inhibitor using the same.

BACKGROUND ART

Korean Patent Laid-Open Publication No. 2017-0142904 (Patent Document 1) discloses a method for preparing a diphenylmethane derivative having an inhibitory activity against SGLT2. According to the document, because the diphenylmethane derivative is prepared by a convergent synthesis method for individually synthesizing and coupling the derivative based on each main group, a synthesis pathway may be simplified and the yield may be enhanced compared to a linear synthesis method disclosed in the prior art, thereby reducing risk factors inherently possessed by a linear synthesis pathway.

However, the method for preparing a diphenylmethane derivative according to Korean Patent Laid-Open Publication No. 2017-0142904 has a disadvantage in that related substances generated at an early stage are not removed because the important reaction steps c3-c7 as shown in Scheme 1 proceed in a four-step continuous process, and the quality of the related substances may not be controlled step by step as one reaction proceeds to affect the next reaction, thereby making it difficult to handle the related substances. Also, the method has drawbacks in that, because the purification of the related substances generated in the continuous process is performed at c7, the related substances should be purified two or more times in order to control the quality of the related substances, which results in a burden of cost due to the purification process, and it is impossible to control the quality step by step by performing several steps in situ.

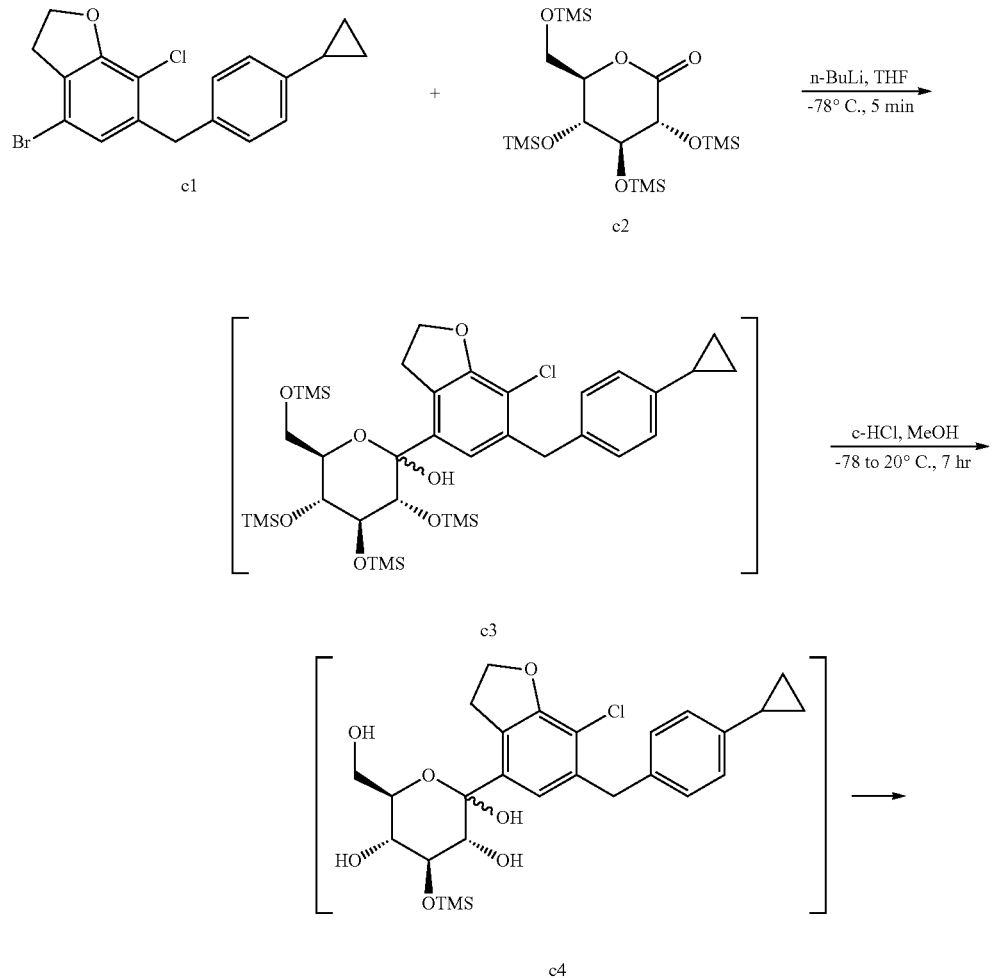

[Scheme 1]

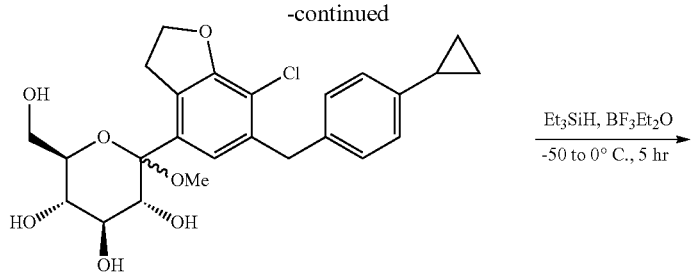

c5

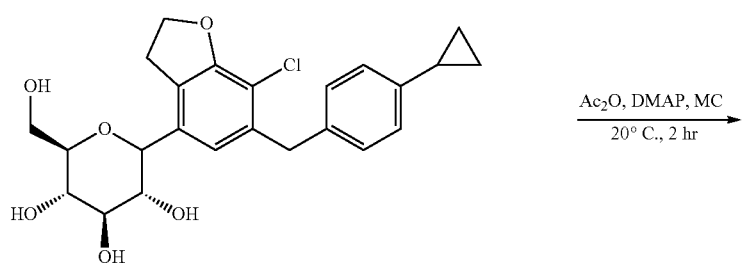

c6

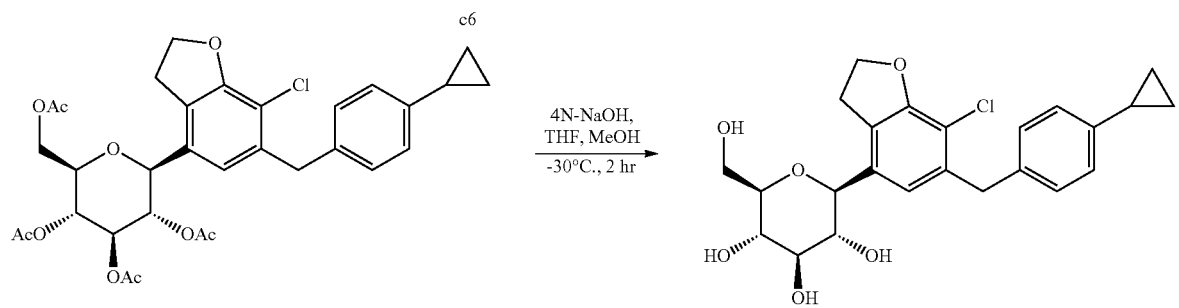

c7          c8

Technical Problem

The present invention is to provide an intermediate useful for the synthesis of an SGLT inhibitor and a method for preparing an SGLT inhibitor using the same.

Technical Solution

A method for preparing a diphenylmethane derivative having an inhibitory activity against SGLT2 as disclosed in Korean Patent Laid-Open Publication No. 2017-0142904 is performed in a process consisting of a total of six steps including an in situ step as shown in [Scheme 1]. After c1 is coupled to c2 to synthesize c3, c3 is first desilylated by addition of c-HCl/MeOH to generate c4. When the reaction proceeds, c4 is slowly methoxylated to generate c5. In this case, it was difficult to crystallize c5 due to its physical properties and the crystallization conditions for c5 were determined in the presence of toluene/hexane by testing several crystallization conditions. However, the related substances are not removed but merely solidified. Because the related substances are not purified, the related substances are transferred to the next reaction in an in situ form, and purified at c7. Most of the related substances including a main related substance may be removed at c7. However, because the previous step is performed without any purification, a purification process should be performed two or more times in order to meet the quality of the related substances. Because the purification process is performed two or more times, the yield may be lowered in this step, and the burden of cost due to the purification process may be caused. Also, because c5 is difficult to store in a crude state due to its degraded chemical stability, it is a high burden to continuously perform the synthesis directly to c7 from the production of c5.

Accordingly, the present inventors have developed a novel intermediate and thereby have designed a method of purifying related substances, and controlling an amount of related substances in a final product (i.e., a diphenylmethane derivative). Therefore, the present invention has been completed based on these facts.

A compound of Chemical Formula 1, which is a final target compound and an active ingredient used as an SGLT inhibitor, is as follows:

[Chemical Formula 1]

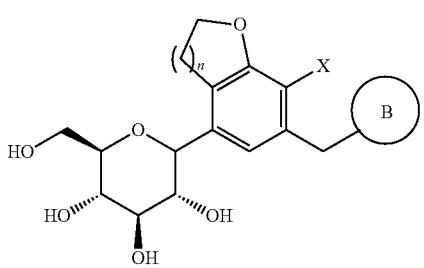

wherein
n is 1 or 2,
X is a halogen (e.g., F, Cl, Br, or I),
B is

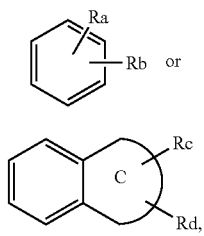

wherein Ra, Rb, Rc, and Rd are each independently hydrogen, a halogen, hydroxy, mercapto, cyano, nitro, amino, carboxy, oxo, a C1-7 alkyl, a C1-7 alkylthio, a C2-7 alkenyl, a C2-7 alkynyl, a C1-7 alkoxy, a C1-7 alkoxy-C1-7 alkyl, a C2-7 alkenyl-C1-7 alkyloxy, a C2-7 alkynyl-C1-7 alkyloxy, a C3-10 cycloalkyl, a C3-7 cycloalkylthio, a C5-10 cycloalkenyl, a C3-10 cycloalkyloxy, a C3-10 cycloalkyloxy-C1-7 alkoxy, a phenyl-C1-7 alkyl, a C1-7 alkylthio-phenyl, a phenyl-C1-7 alkoxy, a mono- or di-C1-7 alkylamino, a mono- or di-C1-7 alkylamino-C1-7 alkyl, a C1-7 alkanoyl, a C1-7 alkanoylamino, a C1-7 alkylcarbonyl, a C1-7 alkoxycarbonyl, carbamoyl, a mono- or di-C1-7 alkylcarbamoyl, a C1-7 alkylsulfonylamino, phenylsulfonylamino, a C1-7 alkylsulfinyl, a C6-14 arylsulfanyl, a C6-14 arylsulfonyl, a C6-14 aryl, a 5- to 13-membered heteroaryl, a 5- to 10-membered heterocycloalkyl, a 5- to 10-membered heterocycloalkyl-C1-7 alkyl, or a 5- to 10-membered heterocycloalkyl-C1-7 alkoxy;

the ring C is a C3-10 cycloalkyl, a C5-10 cycloalkenyl, a C6-14 aryl, a 5- to 13-membered heteroaryl, or a 5- to 10-membered heterocycloalkyl;

the alkyl, the alkenyl, the alkynyl, and the alkoxy are each independently unsubstituted, or have one or more substituents selected from the group consisting of a halogen, hydroxy, cyano, nitro, amino, mercapto, a C1-7 alkyl, and a C2-7 alkynyl;

the cycloalkyl, the cycloalkenyl, the aryl, the heteroaryl, and the heterocycloalkyl are each independently unsubstituted, or have one or more substituents selected from the group consisting of a halogen, hydroxy, cyano, nitro, amino, mercapto, a C1-4 alkyl, and a C1-4 alkoxy; and the heteroaryl and the heterocycloalkyl each independently contain one or more heteroatoms selected from the group consisting of N, S, and O.

According to an exemplary embodiment of the present invention, the ring B-1 may be selected from the group consisting of the following:

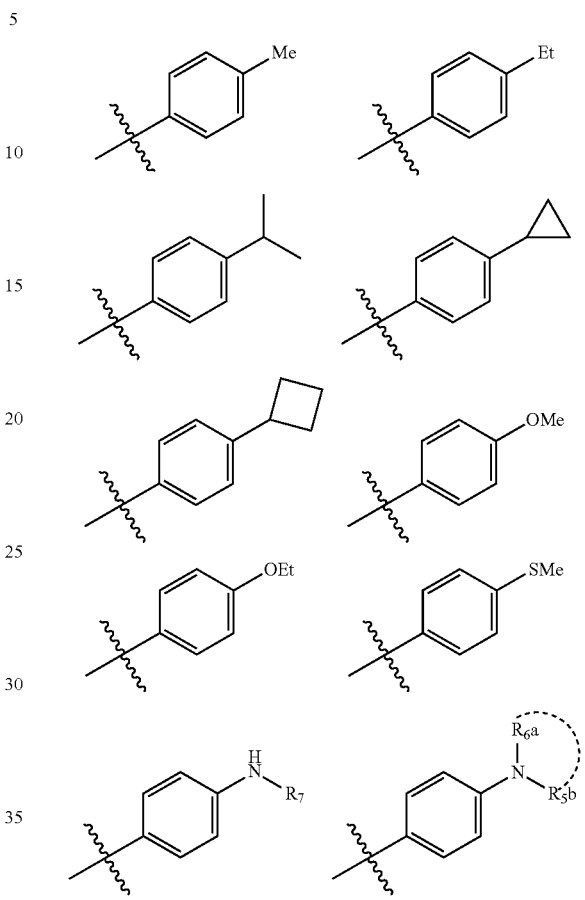

wherein R7 is hydrogen or a C1-7 alkyl; $R_{8a}$ and $R_{8b}$ are each independently a C1-7 alkyl, or are taken together to form a 5- to 10-membered heterocycloalkyl (containing one or more heteroatoms selected from the group consisting of N, S, and O).

According to another exemplary embodiment, the ring B-2 may be selected from the group consisting of the following:

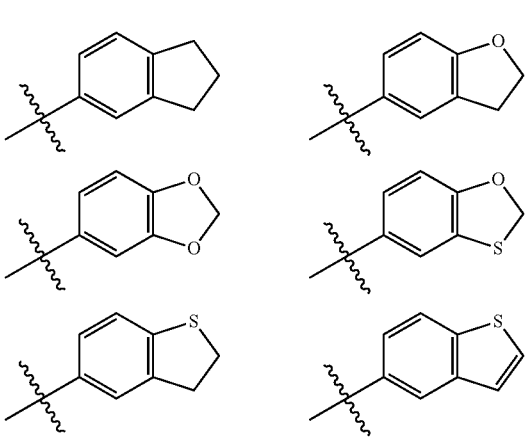

-continued

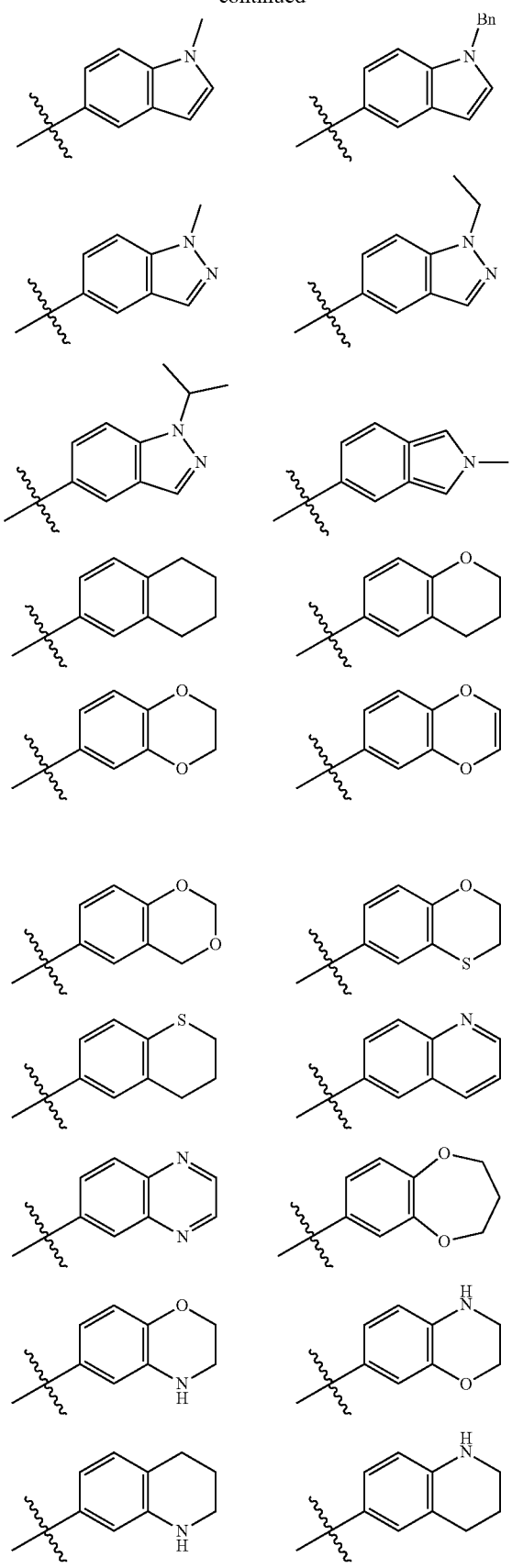

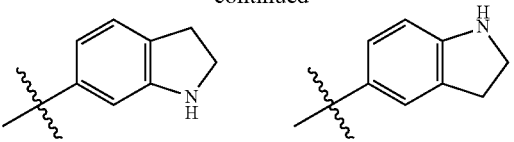

According to one preferred example of the compound of Chemical Formula 1, n may be 1; X may be a halogen; and B may be phenyl unsubstituted or substituted with one or two substituents selected from the group consisting of a halogen, hydroxy, cyano, nitro, amino, mercapto, a C1-7 alkyl, a C3-10 cycloalkyl, and a C1-7 alkoxy.

Also, the compound of Chemical Formula 1 may be a compound in which a binding site of a heterocycloalkyl ring to the diphenylmethane derivative is in an a-form, a p-form, or a racemic form thereof.

For example, the compound of Chemical Formula 1 may be a compound of the following Chemical Formula 1a:

[Chemical Formula 1a]

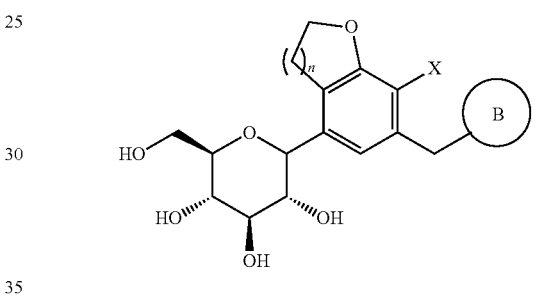

wherein B, n, and X are as defined above.

The present invention provides a method for preparing a compound of Chemical Formula 5 that is an intermediate used to prepare the diphenylmethane derivative of Chemical Formula 1.

To obtain the compound of Chemical Formula 5, a compound of Chemical Formula 4 may be synthesized as described below, and used, but the present invention is not limited thereto.

A compound of Chemical Formula 2 may be allowed to react with a compound of Chemical Formula 3 in the presence of n-butyllithium, sec-butyllithium, t-butyllithium, or i-propylmagnesium chloride to obtain a compound of the following Chemical Formula 4:

[Chemical Formula 2]

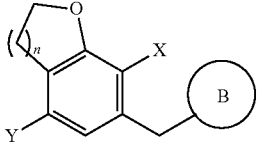

[Chemical Formula 3]

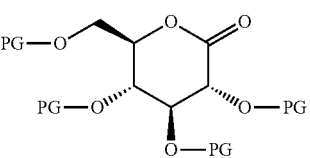

-continued

[Chemical Formula 4]

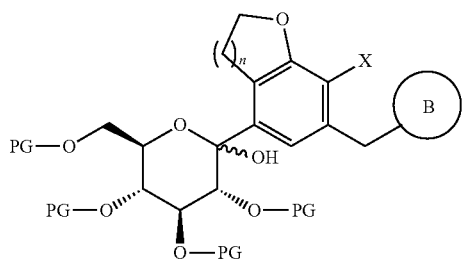

wherein n, B, and X are as defined above, Y is a halogen; and PG is a protecting group.

The reaction of the compound of Chemical Formula 2 with the compound of Chemical Formula 3 may be performed in the presence of n-butyllithium, sec-butyllithium, t-butyllithium, i-propylmagnesium chloride (i-PrMgCl), and the like.

The compound of Chemical Formula 2 may be allowed to react with the compound of Chemical Formula 3 to obtain a compound of the following Chemical Formula 4:

[Chemical Formula 4]

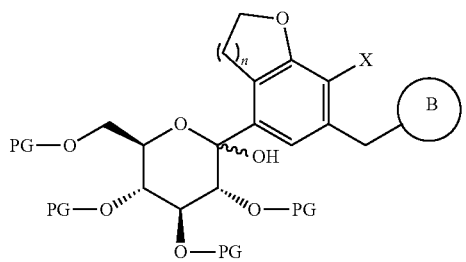

wherein n is 1 or 2; X is a halogen; PG is a protecting group; and B is as defined above in Chemical Formula 1.

In the steps of the reaction of the compound of Chemical Formula 2 with the compound of Chemical Formula 3, first, a binding reaction is performed. In this case, each of the compound of Chemical Formula 3 and the reaction reagent (i.e., n-butyllithium, sec-butyllithium, t-butyllithium, or i-propylmagnesium chloride) may be used in a range of 1.5 to 2.5 equivalents, more preferably in a range of 1.7 to 2.3 equivalents, and particularly at an amount of approximately 2.0 equivalents relative to one equivalent of the compound of Chemical Formula 2. In this case, the reaction may be performed in a temperature range of −80° C. to −10° C., more preferably −70° C. to −60° C. for 1 to 12 hours, or 1 to 3 hours. Also, a single solvent of tetrahydrofuran or ether, a mixed tetrahydrofuran/toluene (1:1) solvent, or the like may be used as the reaction solvent.

The present invention provides a method for preparing a compound of Chemical Formula 5, which comprises: subjecting the compound of Chemical Formula 4 to deprotection and ring-opening reactions under an acidic condition in the presence of water to obtain a compound of the following Chemical Formula 5:

[Chemical Formula 5]

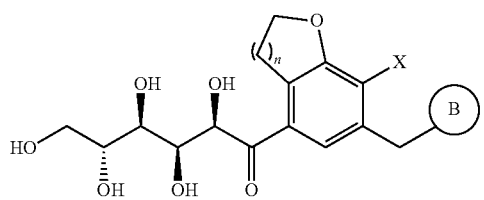

wherein n, B, and X are as defined above.

The subjecting of the compound of Chemical Formula 4 to the deprotection and ring-opening reactions to obtain a compound of the following Chemical Formula 5 may be performed under an acidic condition.

Examples of the acid used herein include hydrochloric acid, sulfuric acid, acetic acid, trifluoroacetic acid, methanesulfonic acid, trifluoromethanesulfonic acid, p-toluenesulfonic acid, hydrogen chloride gas, and the like, which may be used in a range of 2 to 5 equivalents, more preferably at 3 equivalents relative to one equivalent of the compound of Chemical Formula 4. In this case, the reaction may be performed in a temperature range of 0 to 40° C., more preferably in a temperature range of 20 to 30° C. for 2 to 24 hours, or 3 to 6 hours.

The compound of Chemical Formula 5 has an open-chain shape as in the c4 compound of Scheme 1 used in the related art. In the process of obtaining the compound of Chemical Formula 5 from the compound of Chemical Formula 4, a reaction product in which the compound of Chemical Formula 5 and a compound of the following Chemical Formula 5R are present in an equilibrium state due to the ring-chain tautomerism is obtained.

[Chemical Formula 5R]

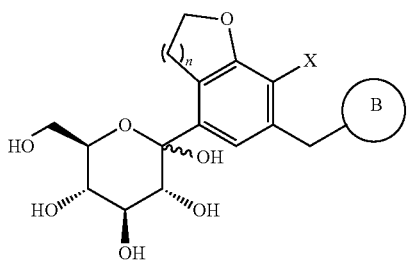

Because the physical properties of the compound of Chemical Formula 5 are different from those of the compound of Chemical Formula 5R, only the compound of Chemical Formula 5 may be crystallized by a crystallization method using changes in the physical properties of the two compounds. In the following examples, the crystallization of the compound of Chemical Formula 5 was performed using a difference in solubility between the compound of Chemical Formula 5 and the compound of Chemical Formula 5R in a crystallization solvent.

Therefore, according to one exemplary embodiment of the present invention, the method for preparing a compound of Chemical Formula 5 may comprise: crystallizing the reaction product, which is obtained by subjecting the compound of Chemical Formula 4 to deprotection and ring-opening reactions under an acidic condition in the presence of water, to obtain the compound of Chemical Formula 5.

The crystallization may be performed by the treatment with a crystallization solvent capable of dissolving the compound of Chemical Formula 5 and the recrystallization of the compound of Chemical Formula 5.

Toluene, dichloromethane, and the like may be used as the crystallization solvent, but the present invention is not limited thereto. The crystallization solvent may be used at an amount 1- to 30-fold, preferably 10- to 20-fold that of the compound of Chemical Formula 5.

On the other hand, the crystallization temperature may be in a range of 20 to 80° C., preferably 40 to 50° C., and the crystallization time may be in a range of 6 to 24 hours, preferably 6 to 12 hours, but the present invention is not limited thereto.

In the process of crystallizing the compound of Chemical Formula 5, it is possible to remove most of the related substances including a main related substance. Therefore, unlike the related art in which it is impossible to remove the related substances in an intermediate process of obtaining a compound of Chemical Formula 1 that is a final target material, the technical object of this disclosure is to develop an intermediate capable of removing the related substances during the process.

Also, the present invention provides a method for preparing a compound of Chemical Formula 1 using the compound of Chemical Formula 5 as an intermediate. Unlike the related art in which the compound of Chemical Formula 1, which is a final target material, is prepared without any purification of the related substances, the high yield and quality may be expected according to the present invention when the compound of Chemical Formula 5 from which the related substances are removed is used as the intermediate to prepare the compound of Chemical Formula 1.

Specifically, the present invention provides a method for preparing a compound of Chemical Formula 1, which comprises:

cyclizing and methoxylating the compound of Chemical Formula 5 under an acidic condition in the presence of a reaction solvent to obtain a compound of Chemical Formula 6; and obtaining the compound of Chemical Formula 1 from the compound of Chemical Formula 6:

[Chemical 5]

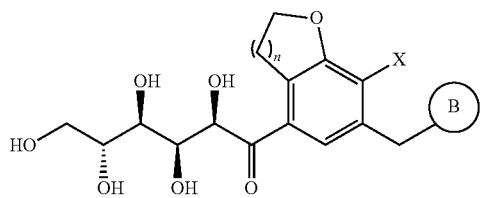

[Chemical Formula 6]

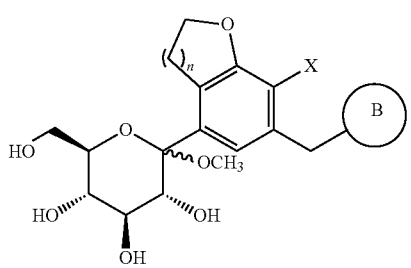

[Chemical Formula 1]

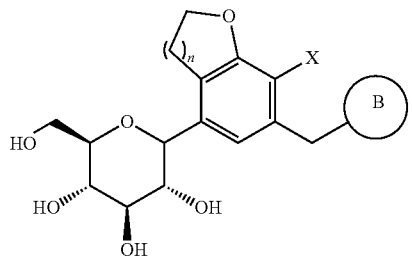

wherein
n is 1 or 2,
X is a halogen (for example, F, Cl, Br, or I),
B is (B-1)

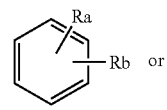

or (B-2)

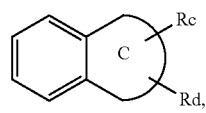

wherein Ra, Rb, Rc, and Rd are each independently hydrogen, a halogen, hydroxy, mercapto, cyano, nitro, amino, carboxy, oxo, a C1-7 alkyl, a C1-7 alkylthio, a C2-7 alkenyl, a C2-7 alkynyl, a C1-7 alkoxy, a C1-7 alkoxy-C1-7 alkyl, a C2-7 alkenyl-C1-7 alkyloxy, a C2-7 alkynyl-C1-7 alkyloxy, a C3-10 cycloalkyl, a C3-7 cycloalkylthio, a C5-10 cycloalkenyl, a C3-10 cycloalkyloxy, a C3-10 cycloalkyloxy-C1-7 alkoxy, a phenyl-C1-7 alkyl, a C1-7 alkylthio-phenyl, a phenyl-C1-7 alkoxy, a mono- or di-C1-7 alkylamino, a mono- or di-C1-7 alkylamino-C1-7 alkyl, a C1-7 alkanoyl, a C1-7 alkanoylamino, a C1-7 alkylcarbonyl, a C1-7 alkoxycarbonyl, carbamoyl, a mono- or di-C1-7 alkylcarbamoyl, a C1-7 alkylsulfonylamino, phenylsulfonylamino, a C1-7 alkylsulfinyl, a C6-14 arylsulfanyl, a C6-14 arylsulfonyl, a C6-14 aryl, a 5- to 13-membered heteroaryl, a 5- to 10-membered heterocycloalkyl, a 5- to 10-membered heterocycloalkyl-C1-7 alkyl, or a 5- to 10-membered heterocycloalkyl-C1-7 alkoxy;

the ring C is a C3-10 cycloalkyl, a C5-10 cycloalkenyl, a C6-14 aryl, a 5- to 13-membered heteroaryl, or a 5- to 10-membered heterocycloalkyl;

the alkyl, the alkenyl, the alkynyl, and the alkoxy are each independently unsubstituted, or have one or more substituents selected from the group consisting of a halogen, hydroxy, cyano, nitro, amino, mercapto, a C1-7 alkyl, and a C2-7 alkynyl;

the cycloalkyl, the cycloalkenyl, the aryl, the heteroaryl, and the heterocycloalkyl are each independently unsubstituted, or have one or more substituents selected from the group consisting of a halogen, hydroxy, cyano, nitro, amino, mercapto, a C1-4 alkyl, and a C1-4 alkoxy; and the heteroaryl and the heterocycloalkyl each independently contain one or more heteroatoms selected from the group consisting of N, S, and O.

The compound of Chemical Formula 5 may be cyclized and methoxylated to obtain the compound of Chemical Formula 6. In this case, a process of obtaining the compound of Chemical Formula 1 from the compound of Chemical Formula 6 is also described in detail in Korean Patent Laid-Open Publication No. 2017-0142904.

The cyclizing and methoxylating of the compound of Chemical Formula 5 to obtain the compound of Chemical Formula 6 may be performed under an acidic condition in the presence of a reaction solvent.

Examples of the acid used herein include hydrochloric acid, sulfuric acid, acetic acid, trifluoroacetic acid, methanesulfonic acid, trifluoromethanesulfonic acid, p-toluenesulfonic acid, hydrogen chloride gas, and the like, which may be used in a range of 2 to 5 equivalents, more preferably at 3 equivalents relative to one equivalent of the compound of Chemical Formula 5. In this case, the reaction may be performed in a temperature range of 0 to 40° C., more preferably in a temperature range of 20 to 30° C. for 2 to 24 hours, or 3 to 6 hours. Also, methanol may be used as the reaction solvent.

The process of obtaining the subsequent compound of Chemical Formula 1 from the compound of Chemical Formula 6 is, for example, performed as follows, but the present invention is not limited thereto.

According to one exemplary embodiment of the present invention, the obtaining of the compound of Chemical Formula 1 from the compound of Chemical Formula 6 may comprise:
reducing the compound of Chemical Formula 6 to obtain a compound of the following Chemical Formula 7; and
introducing a protecting group into the compound of Chemical Formula 7 and recrystallizing and deprotecting the protecting group-introduced compound to obtain the compound of Chemical Formula 1:

[Chemical Formula 7]

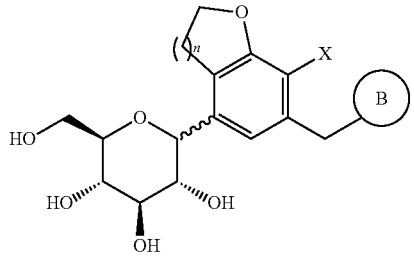

wherein n, B, and X are as defined above.

In the reducing of the compound of Chemical Formula 6 to obtain the compound of Chemical Formula 7, a reduction reaction may be performed using a reducing agent and an acid. Examples of the reducing agent that may be used herein include triethylsilane, triisopropylsilane, t-butyldimethylsilane, sodium borohydride, and the like, and examples of the acid that may be used herein include boron trifluoride diethyl ether, trimethylsilyl trifluoromethanesulfonate, aluminum chloride, trifluoroacetic acid, trifluoromethanesulfonic acid, and the like. The reducing agent may be used in a range of 2 to 5 equivalents, more preferably at approximately 3 equivalents, and the acid may be used in a range of 1.5 to 3 equivalents, more preferably at approximately 2 equivalents. In this case, the reaction may be performed in a temperature range of −50° C. to 0° C., more preferably in a temperature range of −20° C. to −10° C. for 2 to 12 hours, or 2 to 5 hours. Also, a single solvent of dichloromethane, 1,2-dichloroethane, acetonitrile, or the like, a mixed dichloromethane/acetonitrile (1:1) or 1,2-dichloroethane/acetonitrile (1:1) solvent, or the like may be used as the reaction solvent.

The introducing of the protecting group into the compound of Chemical Formula 7 and the recrystallizing and deprotecting of the protecting group-introduced compound may be performed by introducing a protecting group into the compound of Chemical Formula 7, and then heating the protecting group-introduced compound in a crystallization solvent such as alcohol, ethyl acetate, or dichloromethane to separate the resulting precipitate and deprotecting the precipitate.

According to still another exemplary embodiment of the present invention, the obtaining of the compound of Chemical Formula 1 from the compound of Chemical Formula 6 may be performed by the steps comprising:
reducing the compound of Chemical Formula 6 to obtain a compound of the following Chemical Formula 7;
introducing a protecting group into the compound of Chemical Formula 7 and recrystallizing the protecting group-introduced compound to separate a compound of Chemical Formula 8; and
deprotecting the compound of Chemical Formula 8 to obtain the compound of Chemical Formula 1:

[Chemical Formula 8]

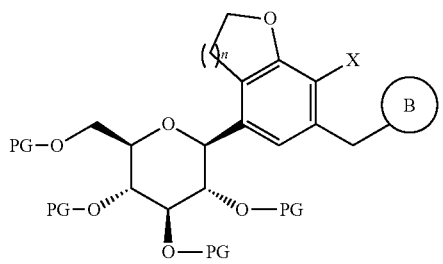

wherein PG is a protecting group; and n, B, and X are as defined above.

The introducing of the protecting group into the compound of Chemical Formula 7 to separate and deprotect only the compound (a p-form) of Chemical Formula 8 is performed. In this case, the reaction may be performed using an acetylating agent and a base. Examples of the acetylating agent include acetyl chloride, acetyl bromide, anhydrous acetic acid, and the like, and examples of the base include sodium hydroxide, sodium carbonate, triethylamine, diisopropylethylamine, pyridine, lutidine, 4-dimethylaminopyridine, and the like. The acetylating agent may be used in a range of 4 to 12 equivalents, more preferably at approximately 8 equivalents, and the base may be used in a range of 1 to 4 equivalents, more preferably approximately at 1.5 equivalents. In this case, the reaction may be performed in a temperature range of 0 to 50° C., more preferably in a temperature range of 20 to 30° C. for 1 to 12 hours, or 1 to 3 hours. Also, acetone, ethyl acetate, tetrahydrofuran, dimethylformamide, dimethylacetamide, dichloromethane, 1,2-dichloroethane, chloroform, and the like may be used as the reaction solvent. Subsequently, a deprotection reaction is performed. In this case, a reagent such as lithium hydroxide, sodium hydroxide, potassium hydroxide, sodium methoxide, sodium ethoxide, or the like may be used in a range of 2 to 12 equivalents, more preferably approximately at 5 equivalents. In this case, the reaction may be performed in a temperature range of 0 to 50° C., more preferably in a temperature range of to 30° C. for 1 to 12 hours, or 1 to 3 hours. Methanol/water (1:1 to 3:1), dichloromethane/methanol (1:1 to 1:2), dichloromethane/ethanol (1:1 to 1:2), tetrahydrofuran/methanol (1:1 to 1:2), tetrahydrofuran/ethanol (1:1 to 1:2), tetrahydrofuran/methanol/water (1:1:3 to 2:1:3), tetrahydrofuran/ethanol/water (1:1:3 to 2:1:3), and the like may be used as the reaction solvent.

The compound of Chemical Formula 1 according to the present invention may be prepared in a crystalline form or amorphous form or a mixture thereof, but the compound having a crystalline form may be preferred in that it has physicochemical properties easy for formulation because it has excellent properties in terms of stability and non-hygroscopicity.

Therefore, the method for preparing a compound of Chemical Formula 1 according to the present invention may comprise: crystallizing the reaction product using various solvents after allowing the compound of Chemical Formula 2 to react with the compound of Chemical Formula 3 followed by deprotection and reduction. In this case, it is possible to generate various crystalline forms. The compounds in various crystalline forms and methods for producing the same are disclosed in detail in Korean Patent Laid-Open Publication No. 2017-0142904.

As one example, the crystallization may be performed using a solvent. In this case, the solvent used for the crystallization may be selected from the group consisting of toluene; ethyl acetate; dichloromethane; acetone; acetonitrile; 2-propanol, tetrahydrofuran; n-hexane, and a mixture thereof (for example, a mixture of tetrahydrofuran and dichloromethane, or a mixture of tetrahydrofuran and n-hexane).

As another example, the solvent used for the crystallization may be selected from a mixture of methanol and distilled water; a mixture of methanol and n-hexane; and a mixture of methanol, dichloromethane and n-hexane.

As still another example, the solvent used for the crystallization may be selected from a mixture of ethanol, distilled water and n-hexane; and a mixture of tetrahydrofuran and toluene.

As yet another example, the solvent used for the crystallization may be a mixture of ethanol and n-hexane.

As one preferred example, the solvent used for the crystallization may be selected from the group consisting of toluene, ethyl acetate, dichloromethane, a mixture of tetrahydrofuran and dichloromethane, and a mixture of tetrahydrofuran and n-hexane.

One exemplary embodiment of the compound of Chemical Formula 5, which is a novel intermediate according to the present invention, is a compound of the following Chemical Formula A.

The compound name of Chemical Formula A is [(2R,3S,4R,5R)-1-(7-chloro-6-(4-cyclopropylbenzyl)-2,3-dihydrobenzofuran-4-yl)-2,3,4,5,6-pentahydroxyhexan-1-one].

The present invention also provides Chemical Formula A and a crystalline form thereof.

In the following example, a method for obtaining a crystalline form of [(2R,3S,4R,5R)-1-(7-chloro-6-(4-cyclopropylbenzyl)-2,3-dihydrobenzofuran-4-yl)-2,3,4,5,6-pentahydroxyhexan-1-one) and characteristics as the crystalline form will be described in detail.

The present invention provides a crystalline form of Chemical Formula A, which is characterized by an X-ray powder diffraction pattern having 6 or more diffraction peaks at a 2[θ] value selected from 7.8±0.2, 8.9±0.2, 15.1±0.2, 16.6±0.2, 17.9±0.2, 19.4±0.2, 20.2±0.2, 21.1±0.2, 22.5±0.2, 22.9±0.2, 24.5±0.2, 26.0±0.2, and 28.7±0.2.

The crystalline form of Chemical Formula A may be a crystalline form characterized by the X-ray powder diffraction pattern having diffraction peaks at a 2[θ] value selected from 7.8±0.2, 8.9±0.2, 15.1±0.2, 16.6±0.2, 17.9±0.2, and 19.4±0.2.

Also, the crystalline form of Chemical Formula A may be a crystalline form characterized by a differential scanning calorimetry trace measured at a heating rate of 1° C. per minute which shows a maximum endothermic peak at a temperature of 190° C. to 200° C.

Advantageous Effects

According to the present invention, by developing a compound of Chemical Formula corresponding to a novel intermediate, the difficulty of purification with existing processes can be solved, the quality requirements for related substances can be satisfied through only one purification step, and the quality control problem in each step can be solved by performing several steps in situ. The method for synthesizing a compound of Chemical Formula 1 using a compound of Chemical Formula 5 according to the present invention allows for the purification in the step of synthesizing a compound of Chemical Formula 5, thereby solving the problems of existing synthesis processes, in which the quality requirements for related substances was difficult to control step by step in a continuous process, and minimizing the amount of related substances in a final product. In addition, as the number of purification steps increases, the process can be simplified because purification is not necessarily performed two or more times in one step as described in the prior art, thereby maximizing the production yield of the diphenylmethane derivative according to Chemical Formula 1.

DESCRIPTION OF DRAWINGS

FIG. 1 shows the results of infrared spectroscopic measurements indicating that the crystal obtained in Step 1 of Example 1 is compound 4.

FIG. 2 shows the results of powder X-ray diffraction analysis of a compound of Chemical Formula A.

FIG. 3 shows the differential scanning calorie (DSC) of a certain compound of Chemical Formula A using a differential scanning calorimeter.

[Chemical Formula A]

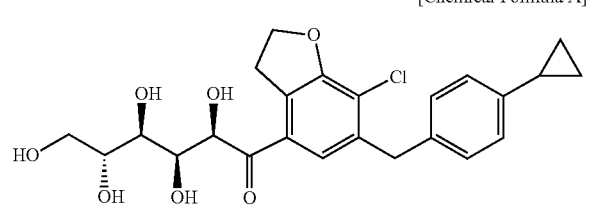

BEST MODE
Example 1: Preparation of Target Compound
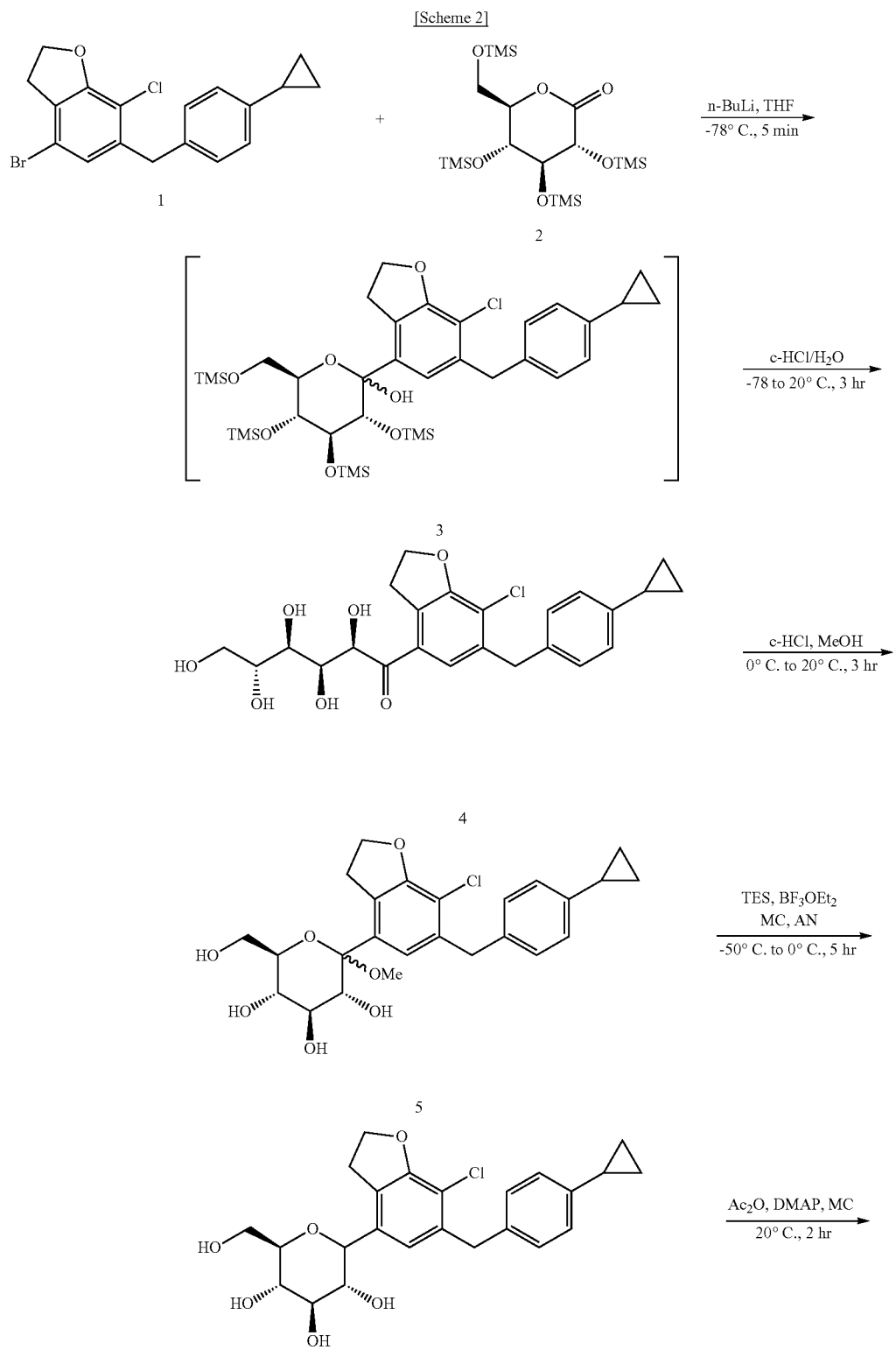

19

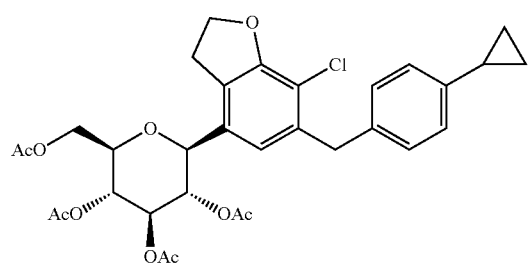

7

20

-continued

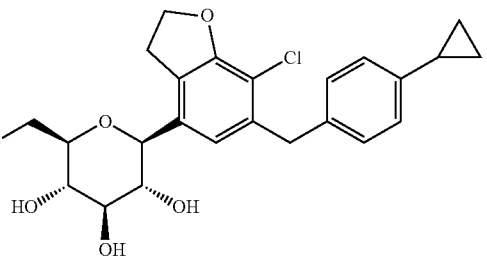

4N-NaOH,
THF, MeOH
35°C., 2 hr

8

Step 1: (2R,3S,4R,5R)-1-(7-chloro-6-(4-cyclopropylbenzyl)-2,3-dihydrobenzofuran-4-y)-2,3,4,5,6-pentahydroxyhexan-1-one (compound 4)

Step 2: (3R,4S,5S,6R)-2-(7-chloro-6-(4-cyclopropylbenzyl)-2,3-dihydrobenzofuran-4-yl)-6-(hydroxymethyl)-2-methoxytetrahydro-2H-pyran-3,4,5-triol (compound 5)

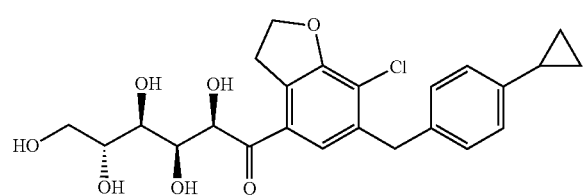 [SMILES: O=C(c1cc(Cc2ccc(C3CC3)cc2)c(Cl)c2c1CCO2)[C@H](O)[C@@H](O)[C@H](O)[C@H](O)CO]

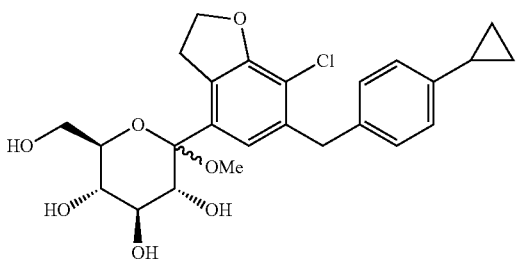 [SMILES: COC1(c2cc(Cc3ccc(C4CC4)cc3)c(Cl)c3c2CCO3)O[C@H](CO)[C@@H](O)[C@H](O)[C@H]1O]

Compound 1 (10.0 g, 1.0 eq) and compound 2 (24.4 g, 1.9 eq) were added to anhydrous THF (80 mL) at room temperature under a nitrogen atmosphere, dissolved, and then cooled to −78° C. An n-BuLi 2.5 M solution (23 mL, 2.1 eq) was slowly added dropwise to the solution in which compound 1 and compound 2 were dissolved over 20 minutes while being maintained at −60° C. or lower. After the dropwise addition was completed, the resulting reaction solution was stirred for 5 minutes. Thereafter, a solution prepared by adding c-HCl (10.2 mL, 4.2 eq) to water (100 mL) was added to the reaction solution. The reaction solution was slowly warmed to room temperature, and stirred for 3 hours. After the completion of the reaction was confirmed by TLC, a saturated NaHCO$_3$ solution was added to the reaction solution (pH 6-8) to terminate the reaction, and the reaction solution was extracted twice with toluene (30 mL). The organic layer was extracted twice with water (30 mL), and toluene (100 mL) was additionally added to the resulting organic layer, and crystallized while stirring at 40 to 50° C. for 12 hours. The resulting crystal was filtered and dried to obtain compound 4 (11.1 g, 87.4%) as a white solid.

$^1$H NMR (500 MHz, DMSO): δ 7.02-7.06 (m, 3H), 6.92-6.94 (m, 2H), 6.27 (d, 1H), 4.84 (d, 1H). 4.66 (d, 1H), 4.47-4.52 (m, 3H), 4.36 (m, 1H), 3.90-3.98 (m, 2H), 3.62-3.65 (m, 2H), 3.50-3.56 (m, 3H), 3.32-3.35 (m, 1H), 3.22-3.27 (m, 1H), 3.08-3.11 (m, 1H), 1.82 (m, 1H), 0.86-0.88 (m, 2H), 0.57-0.59 (m, 2H); LC-MS: [M−H]− 461, mp 195° C.

Compound 4 (5.0 g, 1.0 eq) was added to MeOH (40 mL), dissolved, and then cooled to 0° C. Thereafter, c-HCl (0.5 mL, 0.5 eq) was added thereto, and then stirred at room temperature for 3 hours. After the completion of the reaction was confirmed by TLC, a 3% NaHCO$_3$ solution was added to the reaction solution to terminate the reaction, and the reaction solution was condensed under vacuum to remove MeOH, and extracted with ethyl acetate. The organic layer obtained by extraction was dried over anhydrous magnesium sulfate, filtered, and then condensed under vacuum to obtain compound 5 (5.2 g, 100%). The product was directly used in the next step without any purification.

Step 3: (3R,4R,5S,6R)-2-(7-chloro-6-(4-cyclopropylbenzyl)-2,3-dihydrobenzofuran-4-yl)-6-(hydroxymethyl)tetrahydro-2H-pyran-3,4,5-triol (compound 6)

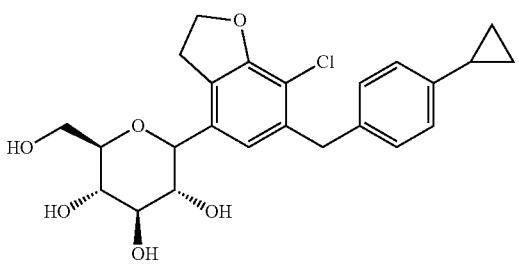 [SMILES: OC[C@H]1OC(c2cc(Cc3ccc(C4CC4)cc3)c(Cl)c3c2CCO3)[C@H](O)[C@@H](O)[C@@H]1O]

Et₃SiH (4.0 mL, 3.0 eq) and BF₃OEt₂ (5.2 mL, 3.0 eq) were sequentially added to a solution of (3R,4S,5S,6R)-2-(7-chloro-6-(4-cyclopropylbenzyl)-2,3-dihydrobenzofuran-4-yl)-6-(hydroxymethyl)-2-methoxytetrahydro-2H-pyran-3,4,5-triol (compound 5) (5.2 g, 1.0 eq) in a mixture of dichloromethane (50 mL) and acetonitrile (50 mL) at −50° C. The reaction mixture was stirred at −50 to −10° C. for 2 hours, and stirred at −10 to 0° C. for 3 hours. After the completion of the reaction was confirmed by TLC, an aqueous saturated NaHCO₃ solution (100 mL) was added to the reaction solution to terminate the reaction, and the reaction solution was extracted with ethyl acetate. The organic layer obtained by extraction was dried over anhydrous magnesium sulfate, filtered, and then condensed under vacuum to obtain compound 6 (4.9 g, 100%). The product was directly used in the next step without any purification.

Step 4: (2R,3R,4R,5S,6S)-2-(acetoxymethyl)-6-(7-chloro-6-(4-cyclopropylbenzyl)-2,3-dihydrobenzofuran-4-yl)tetrahydro-2H-pyran-3,4,5-triyl triacetate (compound 7)

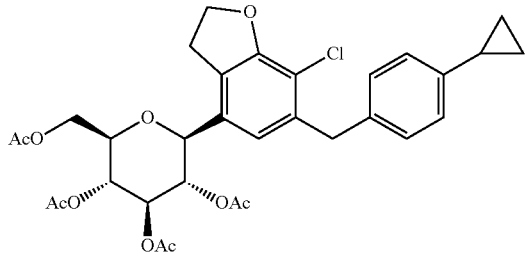 [SMILES: CC(=O)OC[C@H]1O[C@@H](c2cc(Cc3ccc(C4CC4)cc3)c(Cl)c3c2CCO3)[C@H](OC(C)=O)[C@@H](OC(C)=O)[C@@H]1OC(C)=O]

Compound 6 (4.9 g, 1.0 eq) was added to dichloromethane (75 mL) and dissolved therein. Then, DMAP (1.6 g, 1.2 eq) and an acetic anhydride (8.3 mL, 8.0 eq) were added thereto at room temperature under a nitrogen atmosphere, and the resulting mixture was stirred for 2 hours. The completion of the reaction was confirmed by TLC, 1 N HCl (50 mL) was added to terminate the reaction, and the reaction solution was extracted with dichloromethane. The organic layer obtained by extraction was dried with anhydrous magnesium sulfate and filtered, and methanol (10 mL) was added thereto. Then, the resulting reaction solution was condensed under vacuum. The condensed residue was added to methanol (50 mL), and crystallized while stirring for an hour. The resulting crystal was filtered and dried to obtain compound 7 (4.5 g, 67.2%) as a white solid.

¹H NMR (500 MHz, CDCl3): δ ¹H NMR (400 MHz, CDCl3) δ 7.04-7.02 (m, 2H), 6.98-6.95 (m, 2H), 6.53 (s, 2H), 5.29-5.24 (m, 1H), 5.18-5.12 (m, 2H), 4.71-4.65 (m, 2H), 4.31-4.26 (m, 1H), 4.25-4.22 (m, 1H), 4.15-4.11 (m, 1H), 4.15-4.11 (m, 1H), 4.05-3.91 (m, 2H), 3.79-3.74 (m, 1H), 3.40-3.35 (m, 2H), 2.60 (s, 3H), 2.05 (s, 3H), 1.99 (s, 3H), 1.88-1.81 (m, 1H), 1.66 (s, 3H), 0.94-0.89 (m, 2H), 0.66-0.61 (m, 2H); [M+Na]+ 637.

Step 5: (2S,3R,4R,5S,6R)-2-(7-chloro-6-(4-cyclopropylbenzyl)-2,3-dihydrobenzofuran-4-yl)-6-(hydroxymethyl)tetrahydro-2H-pyran-3,4,5-triol (compound 8)

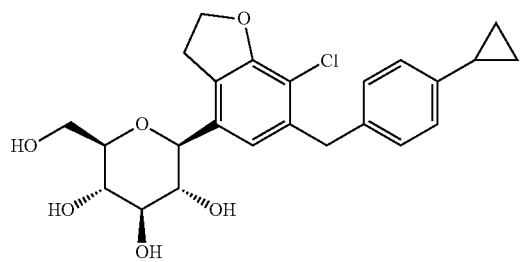 [SMILES: OC[C@H]1O[C@@H](c2cc(Cc3ccc(C4CC4)cc3)c(Cl)c3c2CCO3)[C@H](O)[C@@H](O)[C@@H]1O]

THF (17.5 mL) and methanol (17.5 mL) were added to Compound 7 (3.5 g, 1.0 eq). A 4 N—NaOH solution (7.1 mL, 5.0 eq) was added to the solution in a slurry state at room temperature, and the resulting mixture was stirred at 30 to 35° C. for 2 hours. The completion of the reaction was confirmed by TLC, and the reaction solution was cooled to 0° C. and adjusted to pH 6.8 by adding 1 N HCl. THF and MeOH used in the reaction were removed by concentration, and the reaction solution was extracted with ethyl acetate. The organic layer obtained by extraction was dried over anhydrous magnesium sulfate, filtered, and then condensed under vacuum. The condensed residue was added to ethyl acetate (40 mL), completely dissolved at 70° C., cooled to 33° C., and then stirred at 33° C. for an hour. Then, IPE (65 mL) was added dropwise for 30 minutes, and the resulting mixture was cooled to 0° C., stirred at 0° C. for an hour, and then kept for an hour. The resulting crystal was filtered and dried to obtain compound 8 (2.4 g, 94.5%) as a white solid.

¹H NMR (500 MHz, CDCl3): δ 7.02 (d, J=8.0 Hz, 2H), 6.92 (d, J=8.0 Hz, 2H), 6.81 (s, 1H), 4.59 (t, J=8.8 Hz, 2H), 4.11 (d, J=9.2 Hz, 1H), 3.96 (ABq, ΔvAB=19.0 Hz, JAB=15.2 Hz, 2H), 3.87-3.84 (m, 1H), 3.67-3.63 (m, 1H), 3.47-3.37 (m, 3H), 3.35-3.33 (m, 3H), 1.85-1.79 (m, 1H), 0.91-0.86 (m, 2H), 0.61-0.57 (m, 2H); [M+Na]+ 469

Experimental Example 1: Confirmation of Crystallization of Compound of Chemical Formula 5

As described above, the compound of Chemical Formula 5 has an open-chain shape as in the c4 compound of Scheme 1 used in the related art. In the process of obtaining the compound of Chemical Formula 5 from the compound of Chemical Formula 4, a reaction product in which the compound of Chemical Formula 5 and a compound of the following Chemical Formula 5R are present in an equilibrium state due to the ring-chain tautomerism was obtained.

In Step 1 of Example 1, it was confirmed through the infrared spectroscopic measurements that only compound 4 was crystallized in an equilibrium state of the c4 compound (corresponding to the compound of Chemical Formula 5R) and compound 4 (corresponding to the compound of Chemical Formula 5) in Scheme 1.

The crystal precipitated through the crystallization was measured by IR. As a result, as shown in FIG. 1, it can be seen that the precipitated crystal was the compound of Chemical Formula 5 having an open-chain shape containing a carbonyl group in the molecule because a characteristic peak corresponding to the carbonyl peak was strongly observed at 1,672 cm-1.

Experimental Example 2: Preparation and Analysis of Crystalline Form

After the compound prepared by the method of the present invention, specifically, unpurified (2R,3S,4R,5R)-1-(7-chloro-6-(4-cyclopropylbenzyl)-2,3-dihydrobenzofuran-4-yl)-2,3,4,5,6-pentahydroxyhexan-1-one (compound 4) was obtained according to Step 1 of Example 1, and crystals were prepared through crystallization using various solvents and then analyzed.

The XRD spectrum was obtained by irradiating the crystals with Cu-Kα radiation (wavelength (λ)=1.54056 Å) according to a conventional method using an X-ray diffraction analyzer to determine X-ray powder diffraction. The differential scanning calorie (DSC) was measured at a rate of +1° C./min using a differential scanning calorimeter.

(1) Preparation of Crystal Using Toluene Solvent

The crystallization using toluene is as described in the end of the procedure of Step 1 in Example 1. Specifically, compound 4 in a solution state was additionally added to toluene (a 10-fold weight of compound 4), and the mixture was crystallized by heating at 40 to 50° C. for 12 hours. The resulting crystal was filtered, washed with toluene (a 2-fold volume of the filtrate), and then dried in a vacuum oven (50° C., 12 hours) to obtain a white crystal (yield: 87.4%).

The XRD spectrum of the prepared crystal shows a crystalline form (crystalline form A) as shown in FIG. 2, and the diffraction angles (2θ), interplanar spacings (d) and relative intensities (I/Io×100) of the characteristic peaks are summarized in Table 1 below.

TABLE 1

| 2θ (±0.2°) | d (Å) | I/I$_0$ (%) | 2θ (±0.2°) | d (Å) | I/I$_0$ (%) |
|---|---|---|---|---|---|
| 7.8 | 11.4 | 37.0 | 20.2 | 4.4 | 7.3 |
| 8.9 | 9.9 | 89.4 | 21.1 | 4.2 | 14.3 |
| 15.1 | 5.9 | 38.6 | 22.5 | 4.0 | 10.1 |
| 16.6 | 5.3 | 100.0 | 22.9 | 3.9 | 10.3 |
| 17.9 | 5.0 | 45.0 | 24.5 | 3.6 | 8.1 |
| 19.4 | 4.6 | 44.7 | 26.0 | 3.4 | 11.5 |
|  |  |  | 28.7 | 3.1 | 9.3 |

As shown in FIG. 3, it can be seen that melt endothermic peaks of the corresponding crystals were observed on the DSC spectrum.

(2) Preparation of Crystal Using Dichloromethane Solvent

The unpurified compound 4 was additionally added to dichloromethane (a 10-fold weight of compound 4), and the mixture was crystallized by heating at 40 to 50° C. for 12 hours. The resulting crystal was filtered, washed with dichloromethane (a 2-fold volume of the filtrate), and then dried in a vacuum oven (50° C., 12 hours) to obtain a white crystal (yield: 88.1%).

The XRD spectrum analysis results of the prepared crystals show that the white crystal had the same crystalline form (crystalline form A) as (1) of Experimental Example 2.

Experimental Example 3: Analysis of Content of Related Substances

The method for preparing a diphenylmethane derivative as disclosed in Korean Patent Laid-Open Publication No. 2017-0142904 proceeds in a four-step continuous process consisting of the important reaction steps c3-c7 as shown in Scheme 1 above, and the purification of the related substances is performed at c7.

The purity and impurity content of c7 obtained through the 1$^{st}$ to 3$^{rd}$ purifications at the step c7 as shown in Scheme 1 in Korean Patent Laid-Open Publication No. 2017-0142904 were compared to the purity and impurity content of c7 (corresponding to compound 7 in Scheme 2) obtained through a single purification at the step c4 (corresponding to compound 4 in Scheme 2) and another single purification at the step c7 (corresponding to compound 7 in Scheme 2) in Scheme 2 of the present invention. The results are listed in Table 2 below.

TABLE 2

|  |  | Purity (%) [Standard: ≥ 98.0] | Impurity C (%) [Standard: ≤ 0.10] |
|---|---|---|---|
| Existing process | 1$^{st}$ purification | 98.5 | 0.15 |
|  | 2$^{nd}$ purification | 99.7 | 0.10 |
|  | 3$^{rd}$ purification | 99.9 | 0.07 |
| Modified process | 1$^{st}$ purification | 99.0 | 0.06 |

As shown in Table 2, according to the preparation method of the present invention, a purification process may be performed during the synthesis of the compound of Chemical Formula 5. Therefore, even without performing a purification process three times in one step as disclosed in Korean Patent Laid-Open Publication No. 2017-0142904, the amount of related substances in the final product may be minimized.

The invention claimed is:
1. A compound of the following Chemical Formula 5:

[Chemical Formula 5]

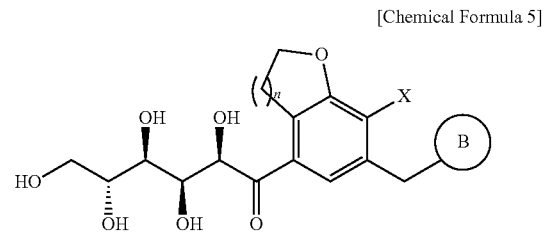

wherein
n is 1 or 2,
X is a halogen,
B is (B-1)

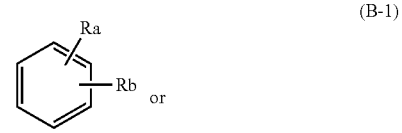

or (B-2)

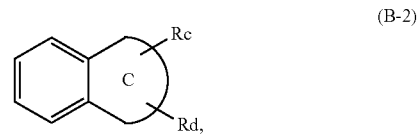

wherein Ra, Rb, Rc, and Rd are each independently hydrogen, a halogen, hydroxy, mercapto, cyano, nitro, amino, carboxy, oxo, a C1-7 alkyl, a C1-7 alkylthio, a C2-7 alkenyl, a C2-7 alkynyl, a C1-7 alkoxy, a C1-7 alkoxy-C1-7 alkyl, a C2-7 alkenyl-C1-7 alkyloxy, a C2-7 alkynyl-C1-7 alkyloxy, a C3-10 cycloalkyl, a C3-7 cycloalkylthio, a C5-10 cycloalkenyl, a C3-10 cycloalkyloxy, a C3-10 cycloalkyloxy-C1-7 alkoxy, a phenyl-C1-7 alkyl, a C1-7 alkylthio-phenyl, a phenyl-C1-7 alkoxy, a mono- or di-C1-7 alkylamino, a mono- or di-C1-7 alkylamino-C1-7 alkyl, a C1-7 alkanoyl, a C1-7 alkanoylamino, a C1-7 alkylcarbonyl, a C1-7 alkoxycarbonyl, carbamoyl, a mono- or di-C1-7 alkylcarbamoyl, a C1-7 alkylsulfonylamino, phenylsulfonylamino, a C1-7 alkylsulfinyl, a C6-14 arylsulfanyl, a C6-14 arylsulfonyl, a C6-14 aryl, a 5- to 13-membered heteroaryl, a 5- to 10-membered heterocycloalkyl, a 5- to 10-membered heterocycloalkyl-C1-7 alkyl, or a 5- to 10-membered heterocycloalkyl-C1-7 alkoxy;

the ring C is a C3-10 cycloalkyl, a C5-10 cycloalkenyl, a C6-14 aryl, a 5- to 13-membered heteroaryl, or a 5- to 10-membered heterocycloalkyl;

the alkyl, the alkenyl, the alkynyl, and the alkoxy are each independently unsubstituted, or have one or more substituents selected from the group consisting of a halogen, hydroxy, cyano, nitro, amino, mercapto, a C1-7 alkyl, and a C2-7 alkynyl;

the cycloalkyl, the cycloalkenyl, the aryl, the heteroaryl, and the heterocycloalkyl are each independently unsubstituted, or have one or more substituents selected from the group consisting of a halogen, hydroxy, cyano, nitro, amino, mercapto, a C1-4 alkyl, and a C1-4 alkoxy; and the heteroaryl and the heterocycloalkyl each independently contain one or more heteroatoms selected from the group consisting of N, S, and O.

2. A method for preparing a compound of the following Chemical Formula 5, comprising: subjecting a compound of the following Chemical Formula 4 to deprotection and ring-opening reactions under an acidic condition in the presence of water to obtain the compound of Chemical Formula 5:

[Chemical Formula 4]

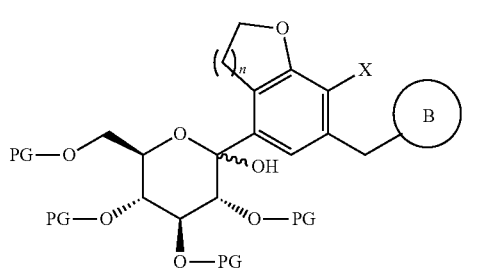

[Chemical Formula 5]

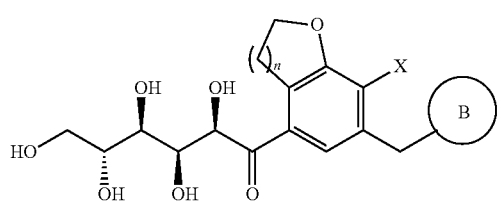

wherein
n is 1 or 2,
X is a halogen,
PG is a protecting group,
B is

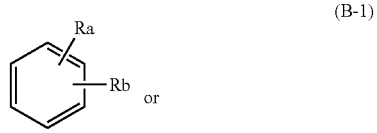

(B-1)

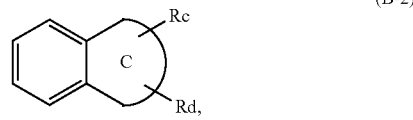

(B-2)

wherein Ra, Rb, Rc, and Rd are each independently hydrogen, a halogen, hydroxy, mercapto, cyano, nitro, amino, carboxy, oxo, a C1-7 alkyl, a C1-7 alkylthio, a C2-7 alkenyl, a C2-7 alkynyl, a C1-7 alkoxy, a C1-7 alkoxy-C1-7 alkyl, a C2-7 alkenyl-C1-7 alkyloxy, a C2-7 alkynyl-C1-7 alkyloxy, a C3-10 cycloalkyl, a C3-7 cycloalkylthio, a C5-10 cycloalkenyl, a C3-10 cycloalkyloxy, a C3-10 cycloalkyloxy-C1-7 alkoxy, a phenyl-C1-7 alkyl, a C1-7 alkylthio-phenyl, a phenyl-C1-7 alkoxy, a mono- or di-C1-7 alkylamino, a mono- or di-C1-7 alkylamino-C1-7 alkyl, a C1-7 alkanoyl, a C1-7 alkanoylamino, a C1-7 alkylcarbonyl, a C1-7 alkoxycarbonyl, carbamoyl, a mono- or di-C1-7 alkylcarbamoyl, a C1-7 alkylsulfonylamino, phenylsulfonylamino, a C1-7 alkylsulfinyl, a C6-14 arylsulfanyl, a C6-14 arylsulfonyl, a C6-14 aryl, a 5- to 13-membered heteroaryl, a 5- to 10-membered heterocycloalkyl, a 5- to 10-membered heterocycloalkyl-C1-7 alkyl, or a 5- to 10-membered heterocycloalkyl-C1-7 alkoxy;

the ring C is a C3-10 cycloalkyl, a C5-10 cycloalkenyl, a C6-14 aryl, a 5- to 13-membered heteroaryl, or a 5- to 10-membered heterocycloalkyl;

the alkyl, the alkenyl, the alkynyl, and the alkoxy are each independently unsubstituted, or have one or more substituents selected from the group consisting of a halogen, hydroxy, cyano, nitro, amino, mercapto, a C1-7 alkyl, and a C2-7 alkynyl;

the cycloalkyl, the cycloalkenyl, the aryl, the heteroaryl, and the heterocycloalkyl are each independently unsubstituted, or have one or more substituents selected from the group consisting of a halogen, hydroxy, cyano, nitro, amino, mercapto, a C1-4 alkyl, and a C1-4 alkoxy; and the heteroaryl and the heterocycloalkyl each independently contain one or more heteroatoms selected from the group consisting of N, S, and O.

3. The method of claim 2, further comprising crystallizing the reaction product, which is obtained by subjecting the compound of Chemical Formula 4 to the deprotection and ring-opening reactions under an acidic condition in the presence of water, to obtain the compound of Chemical Formula 5.

4. The method of claim 3, wherein the crystallization is performed by the treatment with a crystallization solvent capable of dissolving the compound of Chemical Formula 5 and the recrystallization of the compound of Chemical Formula 5.

* * * * *